(12) United States Patent
Unger et al.

(10) Patent No.: US 12,280,625 B2
(45) Date of Patent: Apr. 22, 2025

(54) VEHICLE WITH A CURVE TILTING FUNCTION

(71) Applicants: CARIAD SE, Wolfsburg (DE); AUDI AG, Ingolstadt (DE)

(72) Inventors: Andreas Unger, Gaimersheim (DE); Michael Jall, Pfaffenhofen a.d. Ilm (DE); Philipp Knuth, Munich (DE); Hanno Stingl, Kipfenberg (DE); Tobias Templer, Hitzhofen (DE)

(73) Assignees: Cariad SE, Wolfsburg (DE); Audi AG, Ingolstadt (DE)

( * ) Notice: Subject to any disclaimer, the term of this patent is extended or adjusted under 35 U.S.C. 154(b) by 228 days.

(21) Appl. No.: 17/900,420

(22) Filed: Aug. 31, 2022

(65) Prior Publication Data

US 2023/0073311 A1 Mar. 9, 2023

(30) Foreign Application Priority Data

Sep. 9, 2021 (DE) ...................... 10 2021 123 306.2

(51) Int. Cl.
*B60G 17/016* (2006.01)

(52) U.S. Cl.
CPC .. *B60G 17/0162* (2013.01); *B60G 2400/0511* (2013.01); *B60G 2400/104* (2013.01); *B60G 2600/604* (2013.01)

(58) Field of Classification Search
CPC ........ B60G 17/0162; B60G 2400/0511; B60G 2400/104; B60G 2400/604
See application file for complete search history.

(56) References Cited

U.S. PATENT DOCUMENTS

| | | | |
|---|---|---|---|
| 2018/0154723 A1* | 6/2018 | Anderson | ............ H02K 7/1823 |
| 2022/0242420 A1* | 8/2022 | Morishima | ......... B60W 30/045 |

FOREIGN PATENT DOCUMENTS

| | | | | |
|---|---|---|---|---|
| DE | 102012024970 A1 | 7/2013 | | |
| DE | 102012024971 A1 | 7/2013 | | |
| DE | 102012024988 A1 | 8/2013 | | |
| DE | 102013013165 A1 * | 2/2014 | ......... | B60W 40/112 |
| DE | 102015006675 B4 | 3/2017 | | |
| DE | 102018101696 A1 | 8/2018 | | |

\* cited by examiner

*Primary Examiner* — George C Jin
(74) *Attorney, Agent, or Firm* — Seed IP Law Group LLP

(57) ABSTRACT

A vehicle having an active chassis system with curve tilting function, comprises a control unit, which when negotiating a curve determines a vehicle tilting angle on the basis of a current vehicle transverse acceleration or a correlated driving operation parameter, by which the vehicle transverse acceleration can be reduced, wherein the control unit uses the vehicle tilting angle so determined to trigger actuators of a suspension/shock absorbing system in order to adjust the vehicle tilting angle. The curve tilting function incorporates a prediction unit which provides the curve negotiation data for an upcoming curve. The vehicle tilting angle is set in consideration of the curve negotiation data.

11 Claims, 4 Drawing Sheets

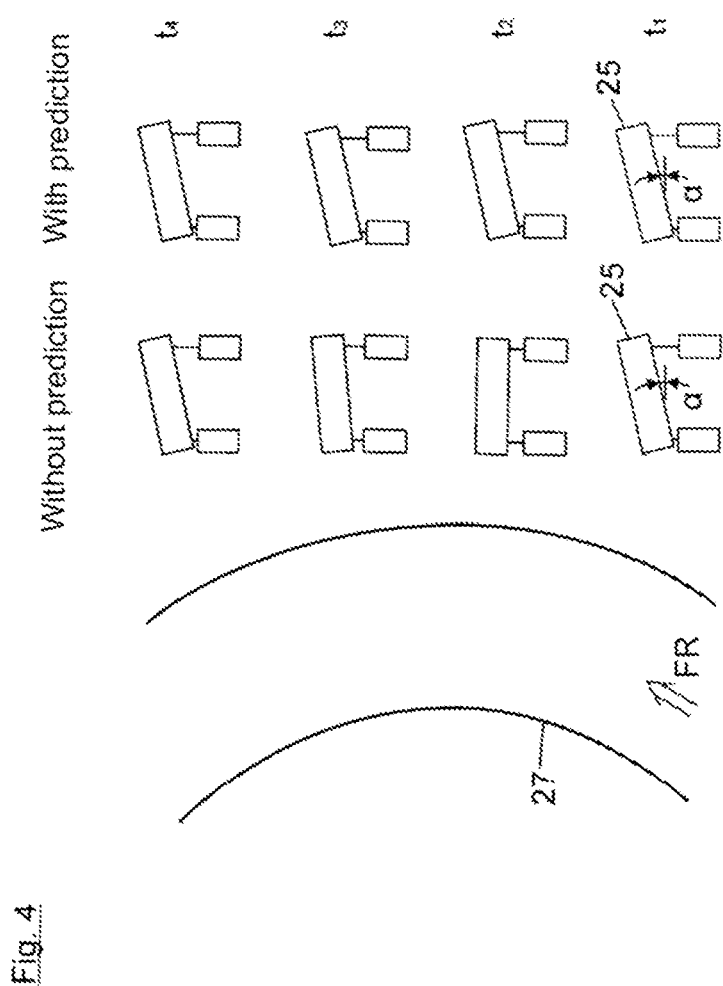

VEHICLE WITH A CURVE TILTING FUNCTION

BACKGROUND

Technical Field

Embodiments of the invention relate to a vehicle with an active chassis system having a curve tilting function.

Description of the Related Art

In the active chassis system of such a vehicle, force-introducing elements in the suspension and shock absorbing system create active forces in the wheel suspension. This makes it possible, on the one hand, to even out irregularities in the road, such as undulating ground, and to maintain the vehicle body at rest. On the other hand, the vehicle body can also be moved or tilted thanks to such a system. One function of this system is to tilt the vehicle body toward the inside when negotiating a curve and thus to reduce proportionately the transverse acceleration when negotiating a curve. The vehicle thus leans into the curve similar to a motorcycle.

In calculating the tilting angle a conflict of goals exists between the maximum tilting angle, the natural feel of the function as experienced by the vehicle passengers, and the maximum tilting angle rate. In order to achieve the greatest possible compensation of the transverse acceleration, the maximum tilting angle must be as large as possible. In order for the function to be felt as being natural by the vehicle passengers, the tilting angle must be completely established at the beginning of the curve and must be completely eliminated once again on the straight stretch of road after the curve. Tilting angle changes should only change when the radius of the curve being traveled also changes. Furthermore, the tilting angle rate must be limited so as not to sacrifice any comfort due to the newly introduced change in the tilting.

A vehicle of this kind comprises an active chassis system with curve tilting function. The curve tilting function comprises a control unit, which when negotiating a curve determines a vehicle tilting angle on the basis of a current vehicle transverse acceleration or a correlated driving operation parameter, by which the vehicle transverse acceleration can be reduced, wherein the control unit uses the vehicle tilting angle so determined to trigger actuators of a suspension/shock absorbing system in order to adjust the vehicle tilting angle.

In the prior art, the curve tilting function works without incorporating future vehicle movements, so that the tilting angle is calculated solely on the basis of the current movement state of the vehicle and the driver's input. This leads to the following challenges:

First of all, a time delay occurs between the entering of the curve (that is, the instant of entering the curve) and the establishing of the tilting angle. Thus, obeying the above indicated boundary conditions for a natural feel and the maximum tilting rate, the maximum tilting angle to be established is limited.

If the curve ends while the tilting angle is still being established, the tilting angle must be instantly eliminated once again. In particular, on roads with fast curve changes, this results in a constant establishing and eliminating of the tilting angle.

A further challenge is the distinguishing as to whether the driver in a constant curve negotiation is only producing a short compensatory steering movement, for example to remain in the travel lane, or whether the steering movement means that the negotiating of the curve is finished. In the first case, the tilting angle must not be eliminated, or if so then only slightly, while in the second case the tilting angle has to be fully reduced once more.

Accordingly, many compromises need to be made when attuning the function, which means that the potential of the curve tilting function cannot be fully exploited.

BRIEF SUMMARY

Some embodiments provide a vehicle having an active chassis system with curve tilting function, the functionality of which is enhanced as compared to the prior art.

Some embodiments include a vehicle having an active chassis system with curve tilting function. This comprises a control unit, which when negotiating a curve determines a vehicle tilting angle on the basis of a current vehicle transverse acceleration or a colliding driving operation parameter, by which the vehicle transverse acceleration can be reduced. The control unit uses the vehicle tilting angle so determined to trigger actuators of a suspension/shock absorbing system in order to adjust the vehicle tilting angle. The curve tilting function incorporates a prediction unit. The prediction unit provides the curve negotiation for an upcoming curve. The vehicle tilting angle is determined in consideration of this curve negotiation data.

Thus, the future stretch of road and in particular the anticipated radii of curvature of an upcoming curve in the road are determined by localization of the current vehicle position on a road map and this is made available to the curve tilting function. This information goes into the calculating of the vehicle tilting angle.

This accomplishes the following: the time delay between the entering of the curve (that is, the instant of entering the curve) and the establishing of the tilting angle can be reduced, since it is already known that the vehicle tilting angle should be established in the near future, based on the anticipated curvature of the curve as determined from the road map, without having to wait for sensor data or driver input.

In event of rapid changing curves, when the curve tilting function would result in a constant establishing and removing of the tilting angle on account of the limitation on the maximum tilting angle rate, the curve tilting function can be switched off. Furthermore, a distinction can be drawn between whether the driver is only performing compensatory steering movements or whether the vehicle tilting angle needs to be removed at the end of the curve (that is, upon exiting the curve). All of this leads to a distinctly better utilization of the potential of the curve tilting function.

The future stretch of road and in particular the anticipated radii of curvature are determined by localization of the vehicle position on a road map and this is made available to the curve tilting function. This information goes into the calculating of the vehicle tilting angles. In this way, the time delay between the entering of the curve (that is, the instant of entering the curve) and the establishing of the tilting angle is reduced as compared to the prior art, since it is already known that the tilting angle should be established, based on the anticipated curvature as determined from the road map, without having to wait for sensor data or driver input.

In event of rapid changing curves, when the function would result in a constant establishing and removing of the tilting angle on account of the limitation on the maximum tilting angle rate, the function can be switched off.

Furthermore, a distinction can be drawn between whether the driver is only performing compensatory steering movements or whether the tilting angle needs to be removed at the end of the curve. All of this leads to a distinctly better utilization of the potential of the function.

In one embodiment, the vehicle body can be controlled by the powering actuators so that the vehicle body is tilted toward the inside of the curve. This reduces proportionately the transverse acceleration acting on the passengers when negotiating the curve. In the prior art, the curve tilting function calculates the tilting angle from the transverse acceleration without further prediction. This can either be measured directly or estimated by customary methods. In the most simple application, the tilting angle is calculated by multiplying the transverse acceleration with a factor. But more complex relationships are also conceivable, using characteristic maps or the involvement of further metered quantities, such as the vehicle longitudinal velocity or the steering angle or other signals.

The transverse acceleration is filtered in advance with a low pass signal filter, such as a Butterworth filter. The corner frequency is the critical factor in the filter behavior. A lower corner frequency (such as 0.5 Hz) results in smoother signals and thus calmer control variables, but it also increases the latency of the filter. With a high corner frequency (such as 5 Hz) the latency of the filter is decreased, but it is also accompanied by greater signal noise.

It is proposed to additionally include the future curvature of the road when calculating the tilting angle. By taking into account the vehicle longitudinal velocity, it can be determined when the tilting angle needs to be established and how long the tilting angle needs to be maintained.

The curvature is extracted from road maps. However, other methods are also conceivable, such as a determination of the curvature from images of a front camera.

With the curvature and the vehicle speed, a high set time ($t_{start}$) is calculated at which the tilting angle exceeds a threshold value. This time can be used to balance out portions of the overall latency of the curve tilting function. The overall latency consists of the latency due to the signal filtering, the latency due to the signal processing, the latency due to the signal transmission, and the latency required by the actuators in order to generate the forces. Of all the latencies mentioned, it is the latency of the signal filtering which is reduced, by setting the low pass filter faster, which means that its corner frequency is increased.

If the high set time ($t_{start}$) is reached, the corner frequency of the signal filtering will be increased. In this way, the moment at which the tilting angle is established will occur earlier than in the prior art, so that the vehicle will lean into the curve sooner.

Furthermore, the instant of exiting the curve can be determined. The instant at which the tilting angle again falls below a threshold value, that is, the instant at which a straight road is to be anticipated, is defined as the instant of exiting the curve. Through a curve negotiating time it can be estimated how long the curve tilting function presumably needs to be maintained. If this time is below a threshold value, the curve tilting function will be blocked and thus not triggered, which is perceived as being more pleasant by the passengers. For example, a road curve consists of two alternating curves in immediate succession. In this case, the curve negotiating time may be below the threshold value. If the prediction is active, the curve tilting function will be blocked for this scenario.

If the vehicle is still negotiating the curve, it may be desirable for the tilting to respond less sensitively to changes in the transverse acceleration caused by driver input. This can be accomplished by reducing the corner frequency of the signal filtering after the curve entry time, so that the filtering becomes more sluggish. The tilting remains constant in this phase, which is perceived as being more comfortable by the passengers.

Aspects of the technology shall be further pointed out specifically in the following: thus, in one technical embodiment, the control unit is connected upstream in the signal flow direction to a low pass filter. The low pass filter generates from the detected current vehicle transverse acceleration a modified transverse acceleration signal by signal filtering. With the aid of the modified transverse acceleration signal, the control unit can determine the vehicle tilting angle. The signal filter behavior of the low pass filter depends on the low pass filter's corner frequency. That is, a low corner frequency results in a smooth transverse acceleration signal with little signal noise, but great latency. The low pass filter latency corresponds to the delay time resulting from the signal filtering in the low pass filter. Accordingly, a high corner frequency in the low pass filter results in a transverse acceleration signal with large signal noise, but small latency.

The curve tilting function may comprise an adapter unit, which adapts the signal filter behavior of the low pass filter on the basis of the curve negotiation data, the current vehicle speed and the current vehicle position in a road map, in particular, it sets the low pass filter's corner frequency according to the upcoming stretch of road.

For example, the prediction unit can provide for the adapter unit the following curve negotiation data, namely, the lead-up time, the curve negotiation time, the curve entry time, the average curve travel time, and the curve exit time.

The counting-down lead-up time indicates the still available time until the instant of entering the curve. For the processing of the lead-up time, the adapter unit can have a comparator, which compares the lead-up time to a threshold value. If the lead-up time is greater than the threshold value, the adapter unit sets the corner frequency at a low value. On the other hand, the adapter unit sets the corner frequency at a high value as soon as the lead-up time falls below the threshold value to a high set time ($t_{start}$).

Alternatively and/or additionally, the prediction unit can provide a curve negotiating time, which lies between the instant of entering the curve and an instant of exiting the curve. The prediction unit can divide up the curve negotiating time into a curve entry time, an average curve travel time, and a curve exit time. In this case, the adapter unit can maintain the corner frequency at the high value in a time interval between the high set time and the expiration of the curve entry time. After expiration of the curve entry time, the adapter unit can decrease the corner frequency from the high value to the low value. In this case, the corner frequency can be maintained at the low value during the average curve travel time and/or during the curve exit time and/or during a straight stretch of road.

To enhance the functionality, the curve tilting function can be associated with a deactivation unit having a comparator. The comparator compares the curve negotiating time with a threshold value. Once the curve negotiating time is less than the threshold value, the deactivation unit generates a blocking signal for the deactivation of the curve tilting function.

The prediction unit can generate the curve negotiation data from a model as to the time variation of the vehicle tilting angle calculated for the upcoming curve.

Furthermore, the prediction unit can provide, as the curve negotiation data, an instant of entry of the curve and an instant of exiting the curve. The prediction unit determines the instant at which a predefined threshold value is exceeded in the model of the vehicle tilting angle to be the instant of entry of the curve. Alternatively and/or additionally, the prediction unit determines the instant at which a predefined threshold value is decreased in the model of the vehicle tilting angle to be the instant of exiting the curve.

BRIEF DESCRIPTION OF THE SEVERAL VIEWS OF THE DRAWINGS

In the following, an embodiment shall be described with the aid of the accompanying figures.

FIGS. 2 to 4 are respective views illustrating the mode of operation of the curve tilting function while traveling different curves.

DETAILED DESCRIPTION

Figure 1:
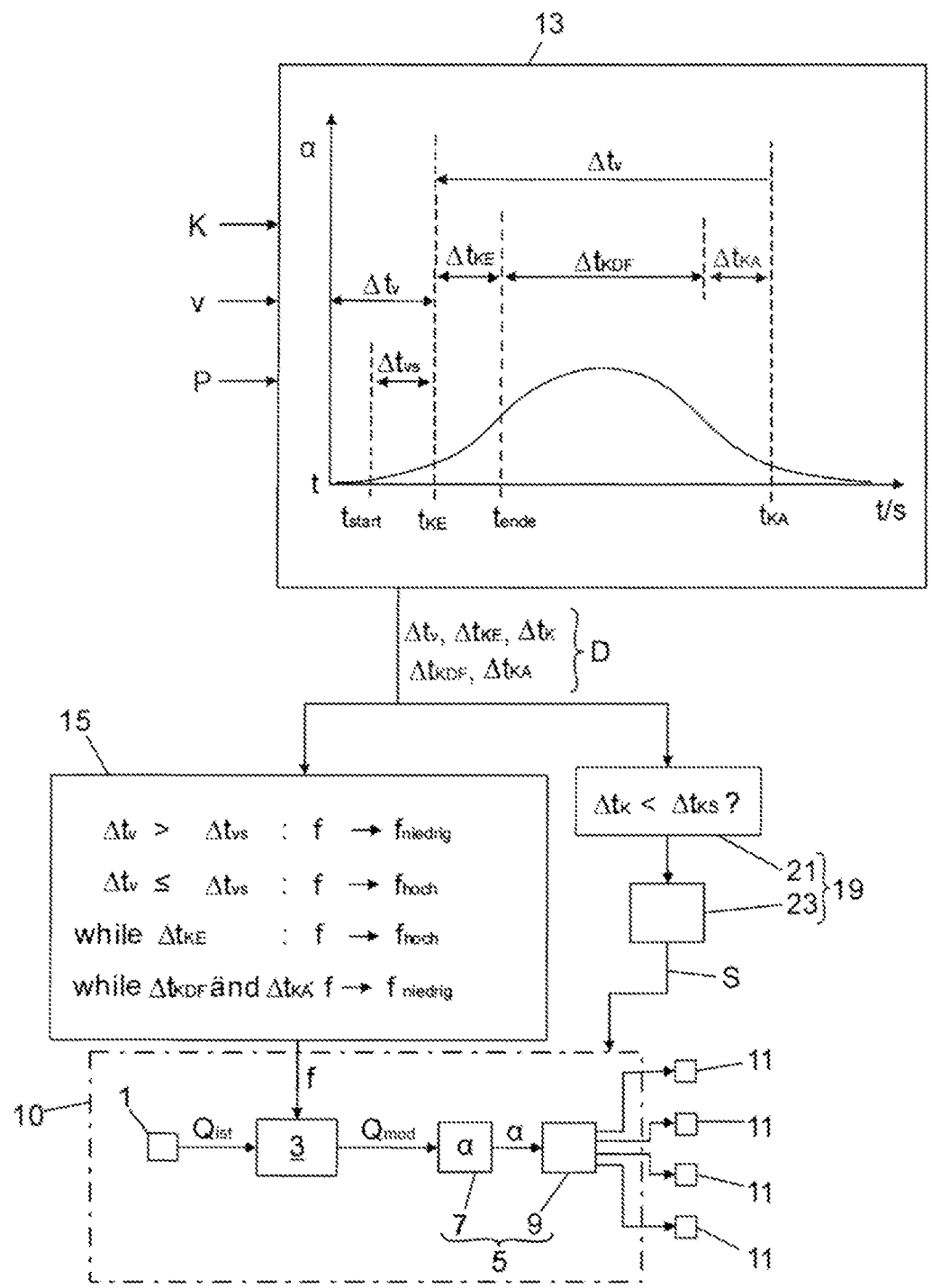
FIG. 1 is a circuit block diagram illustrating a curve tilting function of a vehicle.

The circuit block diagram of FIG. 1 describes a curve tilting function 10 which is integrated in an active chassis system of a vehicle. The curve tilting function 10 comprises a sensor device 1, by means of which the current transverse acceleration $a_{ist}$ can be detected. The sensor device 1 is connected downstream in the signal flow direction from a low pass filter 3 and a control unit 5 connected to it. The control unit 5 is composed of a calculator 7 and a signal generator 9. This is in signal connection with actuators 11 of a suspension/shock absorbing system of the vehicle. The low pass filter 3 generates from the current vehicle transverse acceleration $a_{ist}$ by signal filtering a modified transverse acceleration signal $a_{mod}$, which is presented at the signal input of the calculator 7 of the control unit 5. Using the modified transverse acceleration signal $a_{mod}$, the calculator 7 determines a vehicle tilting angle α. On this basis, control signals for the actuators 11 of the suspension/shock absorbing system of the vehicle are determined in the signal generator 9, with which the actuators 11 are controlled to adjust the vehicle tilting angle α while negotiating a curve.

In some embodiments, a prediction unit 13 is incorporated in the curve tilting function 10, which provides curve negotiation data D on an upcoming curve. The setting of the tilting angle α is done in consideration of these curve negotiation data D. In FIG. 1, the curve negotiation data D generated in the prediction unit 13 are read out in an adapter unit 15. The adapter unit 15 uses the curve negotiation data D to adapt a corner frequency f of the low pass filter 3, with which the signal filter behavior of the low pass filter 3 can be changed. That is, a low corner frequency $f_{niedrig}$ results in a smooth transverse acceleration signal $a_{mod}$ with low signal noise, but with large latency. The latency indicates the delay time due to the signal filtering occurring in the low pass filter. Conversely, a high corner frequency $f_{hoch}$ results in a transverse acceleration signal $a_{mod}$ with large signal noise, but slight latency.

In the prediction unit 13, a model is created for the time variation α(t) of the vehicle tilting angle α calculated for the upcoming curve negotiation on the basis of the curve trend of the upcoming road curve, on the basis of the current vehicle speed v, and on the basis of the current vehicle position P in a road map stored in the prediction unit 13. The prediction unit 13 uses the time variation α(t) to determine the relevant curve negotiation data D for the upcoming curve negotiation. These data are the remaining lead-up time $\Delta t_V$ until the instant of entering the curve $t_{KE}$ and the curve negotiation time $\Delta t_K$, extending from the instant of entering the curve $t_{KE}$ to the instant of exiting the curve $t_{KA}$. Furthermore, in the model of the prediction unit 13 shown in FIG. 1, the curve negotiating time $\Delta t_K$ is divided into a curve entry time $\Delta t_{KE}$, an average curve travel time $\Delta t_{KDF}$, and a curve exit time $\Delta t_{KA}$.

The adapter unit 15 comprises a comparator, which compares the lead-up time $\Delta t_V$ to a threshold value $\Delta t_{VS}$. If the lead-up time $\Delta t_V$ is greater than the threshold value $\Delta t_{VS}$, the adapter unit 15 sets the corner frequency f at a low value $f_{niedrig}$. On the other hand, the adapter unit 15 sets the corner frequency f at a high value $f_{hoch}$ once the lead-up time $\Delta t_V$ falls below the threshold value $\Delta t_{VS}$. This occurs in the model of the prediction unit 13 at a high set time $t_{start}$.

Furthermore, the adapter unit 15 maintains the corner frequency f at the high value $f_{hoch}$ in a time interval between the high set time $t_{start}$ and the expiration $t_{ende}$ of the curve entry time $\Delta t_{KE}$. On the other hand, the adapter unit 15 resets the corner frequency f at the low value $f_{niedrig}$ after expiration $t_{ende}$ of the curve entry time $\Delta t_{KE}$, that is, during the average curve travel time $\Delta t_{KDF}$ and the curve exit time $\Delta t_{KA}$.

As further emerges from FIG. 1, the curve tilting function 10 is associated with a deactivation unit 19 having a comparator 21 and with a signal generating unit 23. The comparator 21 compares the curve negotiating time $\Delta t_K$ with a threshold value $\Delta t_{KS}$. If the curve negotiating time $\Delta t_K$ is less than the threshold value $\Delta t_{KS}$, the signal generating unit 23 generates a blocking signal S, with which the curve tilting function 10 can be deactivated.

The prediction unit 13 defines the instant at which the vehicle tilting angle α in the model exceeds a predefined threshold value as the instant of entering the curve $t_{KE}$. Furthermore, the prediction unit 13 defines the instant at which the vehicle tilting angle α in the model falls below a predefined threshold value as the instant of exiting the curve $t_{KA}$.

Figure 2:
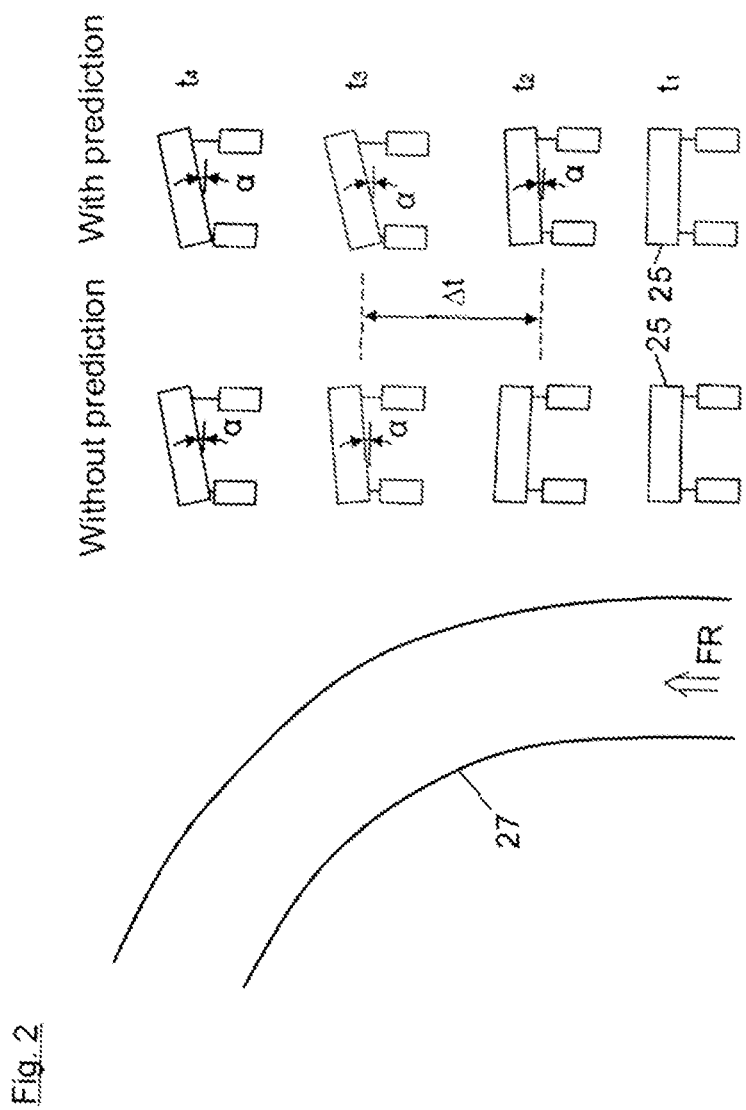

In FIG. 2 is shown a time sequence $t_1$ to $t_4$ of the tilting angle α of a vehicle 25 (indicated roughly from the rear) as set by a curve tilting function 10 during the negotiating of a road curve 27. The setting of the tilting angle α is performed in FIG. 2 by a comparison curve tilting function known in the prior art with no prediction (that is, without a prediction unit 13 and without an adapter unit 15) and by a curve tilting function 10 with prediction (that is, with a prediction unit 13 and with an adapter unit 15). As can be seen from FIG. 2 in combination with FIG. 1, upon reaching the high set time $t_{start}$ the corner frequency f is set by the adapter unit 15 at a high value $f_{hoch}$. In this way, the tilting angle α can be established already at an early time $t_2$ during the negotiating of the curve. By contrast with this, in the comparison curve tilting function without prediction the establishing of the tilting angle α occurs only at a time $t_3$ with a delay time $\Delta t$ after the time $t_2$.

Figure 3:
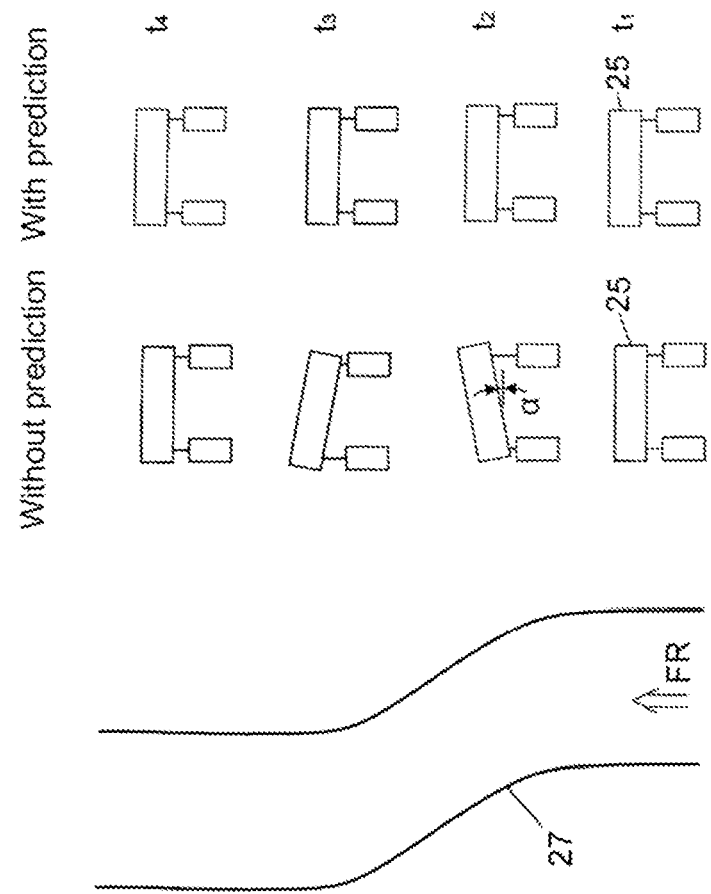

FIG. 3 shows the negotiating of a curve on a road curve 27 consisting of two alternating curves in immediate succession. In the curve tilting function 10 with prediction, the curve negotiating time $\Delta t_K$ is determined in the prediction unit 13 at which the curve tilting function 10 can presumably be activated. In the scenario shown in FIG. 3, for example, the curve negotiating time $\Delta t_K$ determined in the prediction unit 13 is less than a threshold value $\Delta t_{KS}$ stored in the deactivation unit 19. Accordingly, the curve tilting function 10 remains deactivated during the curve negotiation. By contrast with this, the comparison curve tilting function without prediction known in the prior art remains active. The vehicle passengers therefore experience a continual establishing and removing of the tilting angle α when moving through the alternating curves in immediate succession, resulting in a loss of comfort.

FIG. 4 shows another negotiating of a curve with a long curve trend. Due to the long curve trend, short compensatory steering movements of the driver occur, for example to remain in the driving lane. In this case, it is desirable for the curve tilting function 10 to respond with less sensitivity to changes in the transverse acceleration produced by driver input after the curve entry time $\Delta t_{KE}$, that is, during the average curve travel time $\Delta t_{KDF}$ and during the curve exit time $\Delta t_{KA}$. This is achieved with the aid of the adapter unit 13, which sets the corner frequency f at a low value $f_{niedrig}$ during the average curve travel time $\Delta t_{KDF}$ and during the curve exit time $\Delta t_{KA}$.

German patent application no. 10 2021 123306.2, filed Sep. 9, 2021, to which this application claims priority, is hereby incorporated herein by reference, in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A vehicle having an active chassis system with a curve tilting function, the vehicle comprising:
  a control unit that, in operation, when negotiating a curve, determines a vehicle tilting angle based on a current vehicle transverse acceleration or a correlated driving operation parameter, by which the current vehicle transverse acceleration can be reduced,
  wherein the control unit uses the vehicle tilting angle to trigger actuators of a suspension/shock absorbing system in order to adjust the vehicle tilting angle,
  wherein the curve tilting function incorporates a prediction unit which, in operation, provides curve negotiation data for an upcoming curve, and the vehicle tilting angle is set based on the curve negotiation data,
  wherein the control unit is connected upstream in a signal flow direction to a low pass filter that, in operation, generates from the current vehicle transverse acceleration a modified transverse acceleration signal by signal filtering, and the control unit, in operation, determines the vehicle tilting angle using the modified transverse acceleration signal,
  wherein a signal filter behavior of the low pass filter is based on a corner frequency of the low pass filter,
  wherein a first corner frequency results in a smooth transverse acceleration signal with first signal noise and first latency, corresponding to a delay time resulting from the signal filtering, and/or a second corner frequency results in a transverse acceleration signal with second signal noise and second latency,
  wherein the second corner frequency is greater than the first corner frequency,
  wherein the second signal noise is greater than the first signal noise, and
  wherein the first latency is greater than the second latency.

2. The vehicle according to claim 1, wherein the curve tilting function comprises an adapter unit that, in operation, adapts the signal filter behavior of the low pass filter.

3. The vehicle according to claim 2 wherein the adapter unit, in operation, adjusts the corner frequency of the low pass filter based on the curve negotiation data.

4. The vehicle according to claim 3, wherein the prediction unit, in operation, provides a counting-down duration up to an instant of entering the curve, and the adapter unit comprises a comparator that, in operation, compares a lead-up time to a threshold value, and if the lead-up time is greater than the threshold value the adapter unit, in operation, sets the corner frequency at a first value, and/or the adapter unit, in operation, sets the corner frequency at a second value as soon as the lead-up time falls below the threshold value to a high set time, wherein the second value is greater than the first value.

5. The vehicle according to claim 4, wherein the prediction unit, in operation, provides a curve negotiating time, which lies between an instant of entering the curve and an instant of exiting the curve.

6. The vehicle according to claim 5, wherein the curve negotiating time is divided up into a curve entry time, an average curve travel time, and a curve exit time.

7. The vehicle according to claim 6, wherein the adapter unit, in operation, maintains the corner frequency at the second value in a time interval between the high set time and an expiration of the curve entry time, and the adapter unit, in operation, maintains the corner frequency at the first value after the expiration of the curve entry time, during the average curve travel time and/or during the curve exit time, and/or during a straight stretch of road.

8. The vehicle according to claim 5, wherein the curve tilting function is associated with a deactivation unit having a comparator that, in operation, compares the curve negotiating time with a threshold value, and the deactivation unit, in operation, generates a blocking signal for deactivation of the curve tilting function once the curve negotiating time is less than the threshold value.

9. The vehicle according to claim 4, wherein the prediction unit, in operation, generates a model for time variation of the vehicle tilting angle calculated for the upcoming curve, and the prediction unit, in operation, uses the model to provide the curve negotiation data for the upcoming curve for the adapter unit, including a lead-up time, a curve negotiating time, a curve entry time, an average curve travel time, and a curve exit time.

10. The vehicle according to claim 9, wherein the prediction unit, in operation, determines an instant at which a predefined threshold value is exceeded in the model of the vehicle tilting angle to be an instant of entering the curve.

11. The vehicle according to claim 9, wherein the prediction unit, in operation, determines an instant at which a predefined threshold value is decreased in the model of the vehicle tilting angle to be an instant of exiting the curve.

* * * * *